United States Patent
Yamamoto et al.

(10) Patent No.: US 10,153,486 B2
(45) Date of Patent: *Dec. 11, 2018

(54) POSITIVE ELECTRODE MATERIAL, POSITIVE ELECTRODE FOR NON-AQUEOUS ELECTROLYTE SECONDARY BATTERY, AND NON-AQUEOUS ELECTROLYTE SECONDARY BATTERY

(71) Applicant: DENSO CORPORATION, Kariya, Aichi-pref. (JP)

(72) Inventors: Nobuo Yamamoto, Kariya (JP); Yoshinori Satou, Kariya (JP); Shigeki Komine, Kariya (JP); Yuta Shimonishi, Kariya (JP); Yuki Tachibana, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 53 days.

This patent is subject to a terminal disclaimer.

(21) Appl. No.: 15/066,057

(22) Filed: Mar. 10, 2016

(65) Prior Publication Data

US 2016/0293948 A1    Oct. 6, 2016

(30) Foreign Application Priority Data

Mar. 31, 2015 (JP) .................. 2015-71718

(51) Int. Cl.
| | |
|---|---|
| H01M 4/505 | (2010.01) |
| H01M 10/052 | (2010.01) |
| H01M 4/525 | (2010.01) |
| H01M 4/36 | (2006.01) |
| H01M 4/02 | (2006.01) |

(52) U.S. Cl.
CPC .......... *H01M 4/505* (2013.01); *H01M 4/366* (2013.01); *H01M 4/525* (2013.01); *H01M 10/052* (2013.01); *H01M 2004/028* (2013.01)

(58) Field of Classification Search
None
See application file for complete search history.

(56) References Cited

U.S. PATENT DOCUMENTS

| 8,734,994 B2 | 5/2014 | Park et al. |
| 2001/0024753 A1 | 9/2001 | Munakata et al. |
| 2002/0012842 A1 | 1/2002 | Tsujimoto et al. |
| 2003/0013017 A1 | 1/2003 | Nagayama et al. |
| 2005/0191551 A1 | 9/2005 | Tsujimoto et al. |
| 2007/0042272 A1 | 2/2007 | Ugaji et al. |
| 2008/0116418 A1 | 5/2008 | Tabuchi et al. |
| 2017/0170476 A1 | 6/2017 | Yamamoto et al. |

FOREIGN PATENT DOCUMENTS

| JP | 2001-250551 A | 9/2001 |
| JP | 2001-345101 A | 12/2001 |
| JP | 2005-038844 A | 2/2005 |
| JP | 3782058 B2 | 6/2006 |
| JP | 2006-202702 A | 8/2006 |
| JP | 2007-188703 A | 7/2007 |
| JP | 2008-010234 A | 1/2008 |
| JP | 2008-127233 A | 6/2008 |
| JP | 2008-127234 A | 6/2008 |
| JP | 2011-129407 A | 6/2011 |

OTHER PUBLICATIONS

Monnaye. Study of the Li2MIIGeO4 series (M=magnesium, calcium, iron, cobalt, nickel, zinc, cadmium. Revue de Chimie Minerale, 13 (5), 422-432 (Year: 1976).*

Monnaye et al. Family of double orthogermanates of lithium Li2MIIGeO4 with MII=magnesium, calcium, iron, cobalt, nickel, zinc, cadmium. Sciences Chimique, 278 (4), 251-253 (Year: 1974).*

Twu et al. Designing New Lithium-Excess Cathode Materials from Percolation Theory: Nanohighways in LixNi2-4x/3Sb. Nano Lett, 2015, 15, 596-602 (Year: 2014).*

Vallaisamy et al. Li2Ni0.5Mn0.5SnO4/C: A Novel Hybrid Composite Electrode for High Rate Applications. Inorg Chem. 2015, 8590-8597 (Year: 2015).*

Seung-Taek Myung, Shinichi Komaba, Kiyoharu Hosoya, Norimitsu Hirosaki, Yusuke Miura, and Naoaki Kumagai, Synthesis of LiNiO. 5Mn0.5-xTixO2 by an Emulsion Drying Method and Effect of Ti on Structure and Electrochemical Properties, Mar. 30, 2005, P2427-2435, Chem. Mater.

R. Dominko, Li2MSiO4 (M=Fe and/or Mn) cathode materials, Oct. 1, 2008, pp. 462-468, Journal of Power Sources, vol. 184, Issue 2.

* cited by examiner

*Primary Examiner* — Tanisha Diggs
(74) *Attorney, Agent, or Firm* — Harness, Dickey & Pierce, P.L.C.

(57) ABSTRACT

A positive electrode material includes: $Li_2Ni_\alpha M^1_\beta M^2_\gamma Mn_\eta O_{4-\epsilon}$; a layered structure including a Li layer and a Ni layer; and a chemical bond of $M^2$-O. $\alpha$ satisfies an equation of $0.50<\alpha \le 1.33$. $\beta$ satisfies an equation of $0 \le \beta < 0.67$. $\gamma$ satisfies an equation of $0.33 \le \gamma \le 1.1$. $\eta$ satisfies an equation of $0 \le \eta \le 1.00$. $\epsilon$ satisfies an equation of $0 \le \epsilon \le 1.00$. $M^1$ represents at least one selected from Co and Ga. $M^2$ represents at least one selected from Ge, Sn and Sb.

11 Claims, 3 Drawing Sheets

POSITIVE ELECTRODE MATERIAL, POSITIVE ELECTRODE FOR NON-AQUEOUS ELECTROLYTE SECONDARY BATTERY, AND NON-AQUEOUS ELECTROLYTE SECONDARY BATTERY

CROSS REFERENCE TO RELATED APPLICATION

This application is based on Japanese Patent Application No. 2015-71718 filed on Mar. 31, 2015, the disclosure of which is incorporated herein by reference.

TECHNICAL FIELD

The present disclosure relates to a positive electrode material, a positive electrode for a non-aqueous electrolyte secondary battery, and a non-aqueous electrolyte secondary battery formed by using the positive electrode.

BACKGROUND

With the spread of electronic devices such as notebook computers, mobile phones, and digital cameras, the demand for secondary batteries for driving these electronic devices is on the increase. In recent years, these electronic devices have increasingly high power consumption with enhancement of functionalities thereof and have been expected to be reduced in size, and hence improvement in performance of the secondary batteries has been required. Among the secondary batteries, a non-aqueous electrolyte secondary battery (particularly, a lithium-ion secondary battery) can be increased in capacity, and this battery has thus been applied to a variety of electronic devices.

Generally, a non-aqueous electrolyte secondary battery has a configuration in which a positive electrode and a negative electrode are connected via a non-aqueous electrolyte (non-aqueous electrolytic solution), and stored in a battery case. In the positive electrode, a positive electrode active material layer containing a positive electrode material typified by a positive electrode active material is formed on the surface of a positive electrode current collector. In the negative electrode, a negative electrode active material layer containing a negative electrode active material is formed on the surface of a negative electrode current collector.

In a lithium-ion secondary battery as a typical example of the non-aqueous electrolyte secondary battery, a lithium composite oxide is used as a positive electrode material (positive electrode active material). This composite oxide is described in Patent Literatures 1 to 8, for example.

Patent Literature 1 describes a positive electrode active material obtained by mixing $Li_xCoMO_2$ and $LiNiMnMO_2$ (both of M are selected from predetermined elements). This positive electrode active material layer includes an active material having a high average voltage at a time of discharge, and an active material with high thermal stability.

Patent Literature 2 describes a positive electrode active material containing a crystal layer with a layered rock-salt structure of $LiNiMnTiO_2$. By containing Ti, this positive electrode active material can obtain high charge/discharge capacities as compared to the case of not containing Ti.

Patent Literature 3 describes a positive electrode active material obtained by mixing $Li_xMnMO_4$ and $LiNiMO_2$ (both of M are selected from predetermined elements). This positive electrode active material is excellent in battery performance after storage at high temperature.

Patent Literature 4 describes a positive electrode active material in which a portion of Li lacks in $LiMnMO_2$ having a layered polycrystalline structure (both of M are selected from predetermined elements). In this positive electrode, distortion and a chemical bond in the crystal are stabilized, to obtain effects of cycle stability during charge/discharge, durable stability, and the like.

Patent Literature 5 describes a positive electrode active material obtained by replacing a portion of Li and a portion of Co with a predetermined M element in $LiCoO_2$ (both of M are selected from predetermined elements). In this positive electrode active material, by replacement of Li and Co with the M element, binding force between a lithium layer and a cobalt layer is strengthened and distortion between the layers and expansion of a crystal lattice are reduced, to obtain the effects of cycle stability during charge/discharge, durable stability, and the like.

Patent Literature 6 describes a positive electrode active material obtained by mixing $LiNiMnCoO_2$ and $Li_2MO_3$ (M is selected from predetermined elements). This positive electrode active material layer includes an active material which exerts an excellent effect on battery capacity and safety and an active material which exerts an effect on cycle characteristics and storage characteristics.

However, any of these positive electrode active materials (positive electrode materials) cannot sufficiently reduce destruction of the crystal structure during charge/discharge, leading to a decrease in capacity of the non-aqueous electrolyte secondary battery, which has been problematic.

For the safety, Non Patent Literature 1 describes a technique of forming a positive electrode containing Ti, namely $LiNiMnTiO_2$.

However, it is described that addition of Ti as described in this Non Patent Literature 1 does not significantly improve the safety.

As another attempt to achieve both the safety and high stability of crystals, Non Patent Literature 2 describes a technique of forming a positive electrode active material that contains Si, having strong binding force with oxygen, in the same amount as that of a transition metal, Namely $Li_2MnSiO_4$.

However, the transition metal takes a 4-coordinated coordination structure in this positive electrode active material, causing instability of the structure during charge, and after all, it is not a positive electrode active material having sufficient durability.

Patent Literature 7 describes a positive electrode active material having Li oxide represented by a $Li[Li_xMe_yM'_z]O_{2+d}$ ($x+y+z=1$, $0<x<0.33$, $0.05 \leq y \leq 0.15$, $0<d \leq 0.1$, Me: at least one selected from Mn, V, Cr, Fe, Co, Ni, Al and B, and M': at least one selected from Ge, Ru, Sn, Ti, Nb and Pt).

However, in a battery using this positive electrode active material, improvement in safety has not been sufficient. Specifically, an addition ratio of the element Me in the transition metal is approximately 14 at %, and there exist oxygen atoms not bonded to the element Me. The chemical bond between the oxygen atoms and the element Me is strong, and chemical bond cleavage (oxygen desorption) hardly occurs. That is, the oxygen atoms not bonded to the element Me contained in the positive electrode active material of Patent Literature 7 become oxygen gas when the battery is formed, which causes deterioration in safety of the battery.

Patent Literature 8 describes that, by having a positive electrode active material with an x-ray absorption spectrum at an oxygen K absorption edge measured by an X-ray absorption fine structure (XAFS) analytical method in which an absorption edge peak that appears in the vicinity of an oxygen K absorption edge at 530 eV shows a certain behavior, reaction on the interface in a charged state is reduced, to improve the battery performance.

However, while the positive electrode active material described in Patent Literature 8 brings an effect of stabilizing the crystal structure on the surface of the positive electrode active material, it has not brought a sufficient effect in terms of safety. Specifically, in the lithium-ion secondary battery (non-aqueous electrolyte secondary battery), there has been a possibility that a crystal structure of a lithium composite oxide used for the positive electrode active material is destructed due to overcharge or the like, to release contained oxygen.

Patent Literature 1: JP 2007-188703-A

Patent Literature 2: JP 2008-127233-A (corresponding to US 2008/116418 A1)

Patent Literature 3: JP 2001-345101-A (corresponding to US 2005/0191551 A1 and US 2002/0012842 A1)

Patent Literature 4: JP 2001-250551-A (corresponding to US 2001/0024753 A1)

Patent Literature 5: Japanese Patent No. 3782058 B (corresponding to US 2003/0013017 A1)

Patent Literature 6: JP 2006-202702

Patent Literature 7: U.S. Pat. No. 8,734,994

Patent Literature 8: JP 2008-127234-A

Non Patent Literature 1: Seung-Taek Myung, and five others, "Synthesis of LiNi0.5Mn0.5−xTixO2 by an Emulsion Drying Method and Effect of Ti on Structure and Electrochemical Properties", Chemistry of Materials, 2005, vol. 17, p. 2427-2435

Non Patent Literature 2: R. Dominko Li2MSiO4 (M=Fe and/or Mn) cathode materials, Journal of Power Sources, 2008, vol. 184, p. 462-468

SUMMARY

It is an object of the present disclosure to provide a positive electrode material, a positive electrode for a non-aqueous electrolyte secondary battery, and a non-aqueous electrolyte secondary battery, which reduce destruction of a crystal structure during charge/discharge and are excellent in safety.

According to a first aspect of the present disclosure, a positive electrode material includes: $Li_2Ni_\alpha M^1_\beta M^2_\gamma Mn_\eta O_{4-\epsilon}$; a layered structure including a Li layer and a Ni layer; and a chemical bond of $M^2$-O. $\alpha$ satisfies an equation of $0.50 < \alpha \le 1.33$. $\beta$ satisfies an equation of $0 \le \beta < 0.67$. $\gamma$ satisfies an equation of $0.33 \le \gamma \le 1.1$. $\eta$ satisfies an equation of $0 \le \eta \le 1.00$. $\epsilon$ satisfies an equation of $0 \le \epsilon \le 1.00$. $M^1$ represents at least one selected from Co and Ga. $M^2$ represents at least one selected from Ge, Sn and Sb.

The above positive electrode material includes Ni in its composition. This Ni forms a local structure with 6-coordinated oxygen (O). As a result, stable charge/discharge is performed. Further, a large amount of Ni as a redox species is contained in the range of $0.50 < \alpha \le 1.33$, thus leading to achievement of high capacity.

Moreover, large amounts of the $M^1$ element and the $M^2$ element are included, thereby to further stabilize the crystal structure and reduce destruction of the bonding structure during charge/discharge. As a result, a decrease in battery capacity is reduced. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all of the oxygen in the Ni layer is adjacent to the $M^2$ element and bonded to the $M^2$ element, thus significantly enhancing the effect to reduce oxygen desorption.

By having a layered structure that includes the Li layer and the Ni layer, the positive electrode material of the present invention can be excellent in conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and the $M^2$ element as main components. In addition, the main component means a component having the largest content ratio.

The above positive electrode material has an $M^2$-O chemical bond. By the positive electrode material having the $M^2$-O chemical bond, desorption of oxygen which is concerned at the time of thermal-runaway is reduced, thus leading to further improvement in safety of the battery.

According to a second aspect of the present disclosure, a positive electrode for a non-aqueous electrolyte secondary battery includes: the positive electrode material according to the first aspect of the present disclosure.

The above positive electrode for a non-aqueous electrolyte secondary battery is formed by using the positive electrode material of the first aspect of the present disclosure, and exerts an effect obtained by the positive electrode material.

According to a third aspect of the present disclosure, a non-aqueous electrolyte secondary battery includes: a positive electrode for a non-aqueous electrolyte secondary battery including the positive electrode material according to the first aspect of the present disclosure.

The above non-aqueous electrolyte secondary battery is formed by using the positive electrode material of the first aspect of the present disclosure, and exerts an effect obtained by the positive electrode material.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
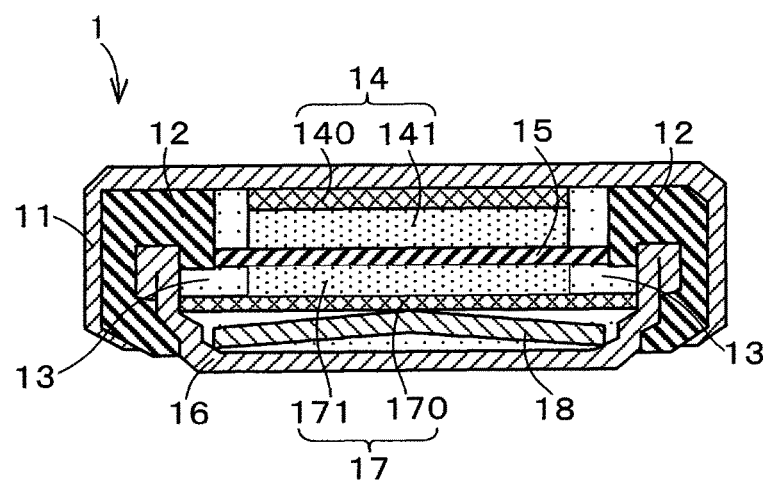
FIG. 1 is a schematic sectional view showing a configuration of a coin type lithium-ion secondary battery of an embodiment.

In order to solve the above problem, the present inventors focused on a structure of a positive electrode material, and found that the above problem was solved by the following: the $M^2$ element and oxygen have a chemical bond in a positive electrode material containing a large amount of the $M^2$ element, which is bonded strongly to oxygen, in addition to the Ni element.

The positive electrode material of the present disclosure contains Ni in its composition. This Ni forms a local structure with 6-coordinated oxygen (O). As a result, stable charge/discharge is performed. Further, a large amount of Ni as a redox species is contained in the range of $0.50<\alpha\leq1.33$, thus leading to achievement of high capacity.

Moreover, large amounts of the $M^1$ element and the $M^2$ element are contained, thereby to further stabilize the crystal structure and reduce destruction of the bonding structure during charge/discharge. As a result, a decrease in battery capacity is reduced. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all of the oxygen in the Ni layer is adjacent to the $M^2$ element and bonded to the $M^2$ element, thus significantly enhancing the effect to reduce the oxygen desorption.

By having a layered structure that includes the Li layer and the Ni layer, the positive electrode material of the present disclosure can be excellent in conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and the $M^2$ element as main components. In addition, the main component means a component having the largest content ratio.

The positive electrode material of the present disclosure has an $M^2$-O chemical bond. By the positive electrode material having the $M^2$-O chemical bond, desorption of oxygen which is concerned at the time of thermal-runaway is reduced, thus leading to further improvement in safety of the battery.

The bonding state between the $M^2$ element and oxygen can be seen by use of a conventionally known analysis method (device). It is particularly preferably to distinguish a local structure of oxygen by analysis of an X-ray absorption fine structure (hereinafter referred to as XAFS). Hereinafter, a general XAFS will be briefly described.

When absorbance of a substance is measured with incident X-ray energy being changed, an abrupt increase in absorbance (absorption edge) is observed when the incident X-ray energy is equal to a core level of atoms constituting the measured material. Thereafter, with an increase in incident X-ray energy, gentle attenuation of the absorbance is observed. When this spectrum is examined in detail, there is found a spectrum structure with a large change in the vicinity of the absorption edge. Further, also in a higher energy region than the absorption edge, there is a spectrum structure having a gentle, though small, vibration structure.

The former is called an X-ray absorption near-edge structure (XANES), and the latter is called an extended X-ray absorption fine structure (EXAFS). Both are collectively called an X-ray absorption fine structure (XAFS).

The spectrum structure of XANES reflects a density of a measured element in an empty state, to cope with a shift of atoms constituting the measured material from the core level to a variety of empty levels.

The positive electrode material of the present disclosure preferably has an absorption edge peak in the range of 532 eV to 535 eV in the XANES spectrum at an oxygen K absorption edge measured by an X-ray absorption fine structure (XAFS) analytical method. By having a peak in this range, the positive electrode material can be confirmed to have the $M^2$-O chemical bond.

The positive electrode for a non-aqueous electrolyte secondary battery and the non-aqueous electrolyte secondary battery according to the present disclosure are formed by using the positive electrode material of the present disclosure, and can exert an effect obtained by the positive electrode material of the present disclosure.

Hereinafter, the present disclosure will be described in detail with reference to embodiments.

Embodiment

In the present embodiment, a coin type lithium-ion secondary battery 1, a configuration of which is shown by a schematic sectional view in FIG. 1 is used. The lithium-ion secondary battery 1 of the present embodiment is a secondary battery (non-aqueous electrolyte secondary battery) formed by using a positive electrode (positive electrode for a non-aqueous electrolyte secondary battery) including the positive electrode material of the present disclosure as a positive electrode active material.

The lithium-ion secondary battery 1 of the present embodiment includes a positive electrode case 11, a sealing member 12 (gasket), a non-aqueous electrolyte 13, a positive electrode 14, a positive electrode current collector 140, a positive electrode mixture layer 141, a separator 15, a negative electrode case 16, a negative electrode 17, a negative electrode current collector 170, a negative electrode mixture layer 171, a holding member 18, and the like.

The positive electrode 14 of the lithium-ion secondary battery 1 of the present embodiment includes the positive electrode mixture layer 141 containing the positive electrode active material formed of the positive electrode material of the present embodiment. The positive electrode mixture layer 141 includes, as necessary, a member such as a binder or a conductive material, other than the positive electrode active material.

(Positive Electrode Material)

The positive electrode material is represented by $Li_2Ni_\alpha M^1_\beta M^2_\gamma Mn_\eta O_{4-\varepsilon}$ ($0.50<\alpha\leq1.33$, $0.33\leq\gamma\leq1.1$, $0\leq\eta\leq1.00$, $0\leq\beta<0.67$, $0\leq\varepsilon\leq1.00$, $M^1$: at least one selected from Co, Ga, $M^2$: at least one selected from Ge, Sn, Sb).

The positive electrode material of the present embodiment contains Ni (transition metal) in its composition. This Ni forms a local structure with 6-coordinated oxygen (O) (6-coordinated local structure). As a result, stable charge/discharge is performed. A large amount of Ni as a redox species is contained in the range of $0.50<\alpha\leq1.33$, thus leading to achievement of high capacity.

Moreover, large amounts of the $M^1$ element and the $M^2$ element are contained, thereby to further stabilize the crystal structure and reduce destruction of the bonding structure during charge/discharge, and as a result, a decrease in battery capacity is reduced. The $M^2$ element strongly fixes oxygen. This results in reduction in desorption of oxygen which is concerned at the time of thermal-runaway, thus leading to further improvement in safety of the battery. Moreover, when the amount of the $M^2$ element is 0.33 or larger, on average, all of the oxygen in the Ni layer is adjacent to the $M^2$ element and bonded to the $M^2$ element, thus significantly enhancing the effect to reduce the oxygen desorption.

A non-aqueous electrolyte secondary battery (lithium ion battery) is overcharged, a malfunction may occur. Occurrence of the malfunction in this battery is greatly influenced by oxygen which is released from the positive electrode active material (positive electrode material) in the process to the occurrence. Specifically, electrons are taken from oxygen of the positive electrode active material during charge, thus making oxygen apt to be released. The $M^2$ element is added in the positive electrode material of the present disclosure, and the added $M^2$ element is bonded more strongly to oxygen than Ni or Mn (transition metal). That is, addition of the $M^2$ element can reduce oxygen desorption during charge/discharge to the minimum.

The positive electrode material of the present embodiment has a layered structure including the Li layer and the Ni layer. With this configuration, the positive electrode has excellent conductivity of Li ions. It is to be noted that the Li layer is a layer formed with Li as a main component, and is a layer substantially composed of Li. The Ni layer is a layer formed with Ni (Ni compound) as a main component, and is substantially a layer containing Ni, the $M^1$ element, and $M^2$ element as main components.

The positive electrode material of the present embodiment has an $M^2$-O chemical bond. By the positive electrode material having the $M^2$-O chemical bond, O is strongly fixed to the $M^2$ element in the positive electrode material. This results in reduction in desorption of oxygen which is concerned at the time of thermal-runaway, thus leading to further improvement in safety of the battery. Consequently, the safety is excellent with the positive electrode material of the present embodiment.

It is to be noted that the measuring method is not limited because of the $M^2$-O chemical bond. For example, the bond can be confirmed by the XAFS analytical method.

The positive electrode material of the present embodiment preferably has an absorption edge peak in the range of 532 eV to 535 eV in the XANES spectrum at an oxygen K absorption edge measured by the XAFS analytical method.

By having a peak in this range, the positive electrode material can be confirmed to have the $M^2$-O chemical bond.

In the positive electrode material of the present embodiment, the $M^1$ element and the $M^2$ element are preferably in a 6-coordinated state, and with this configuration, a structural gap with the adjacent transition metal element (a coordination structure of Ni) can be made small and the durability can further be improved.

The positive electrode material of the present embodiment may further contain Mn which is a transition metal in its composition (at the ratio of not smaller than 0 and not larger than 1.00). Similarly to Ni, this Mn forms a local structure with 6-coordinated oxygen (O) (6-coordinated local structure). By being contained at this ratio, Mn exerts the effect of stabilizing the Ni layer.

The positive electrode active material has to include the above positive electrode material as the positive electrode active material, and may further include another positive electrode active material (positive electrode material). The other positive electrode active material may either be another material included in the above chemical expression, or be still another component.

(Configuration Other Than Positive Electrode Active Material)

The lithium-ion secondary battery 1 of the present embodiment can be configured similarly to the conventional lithium-ion secondary battery except for the use of the above positive electrode material as the positive electrode active material.

In the positive electrode 14, the positive electrode mixture layer 141 is formed by applying, to the positive electrode current collector 140, a positive electrode mixture obtained by mixing the positive electrode active material, a conductive material, and a binder.

The conductive material ensures electrical conductivity of the positive electrode 14. Examples of the conductive material to be used may include, but are not limited to, fine particles of graphite, acetylene black, Ketjen black, carbon black such as carbon nanofiber, fine particles of amorphous carbon such as needle coke.

The binder binds positive electrode active material particles or the conductive material. Examples of the binder to be used may include, but are not limited to, PVDF, EPDM, SBR, NBR, fluoro-rubber, and the like.

The positive electrode mixture is dispersed in a solvent and applied to the positive electrode current collector 140. As the solvent, normally, an organic solvent for dissolving the binder is used. Examples of the solvent may include, but are not limited to, NMP, dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran. Further, a dispersant, a thickener or the like may be added to water to form the positive electrode active material into a slurry by PTFE or the like.

Examples of the positive electrode current collector 140 to be used may include, but are not limited to, products obtained by processing a metal such as aluminum or stainless, specifically a foil processed into a sheet, net, punched metal, or a formed metal.

(Non-Aqueous Electrolyte)

The non-aqueous electrolyte 13 obtained by dissolving a supporting electrolyte into an organic solvent is used.

The kind of the supporting electrolyte of the non-aqueous electrolyte 13 is not particularly limited to, but is preferably one of mineral salts selected from $LiPF_6$, $LiBF_4$, $LiClO_4$, and $LiAsF_6$, derivatives of these mineral salts, organic salts selected from $LiSO_3CF_3$, $LiC(SO_3CF_3)_3$, $LiN(SO_2CF_3)_2$, $LiN(SO_2C_2F_5)_2$, $LiN(SO_2CF_3)(SO_2C_4F_9)$, and derivatives of these organic salts. These supporting electrolytes can make the battery performance more excellent, and can keep the battery performance higher also in a temperature range other than a room temperature. A concentration of the supporting electrolyte is not particularly limited, and it is preferable to appropriately select the concentration in consideration of the kinds of the supporting electrolyte and the organic solvent, according to the use.

The organic solvent (non-aqueous solvent) into which the supporting electrolyte is dissolved is not particularly limited so long as the organic solvent is used for a normal non-aqueous electrolyte. For example, carbonates, halogenated hydrocarbon, ethers, ketones, nitriles, lactones, oxolane compound, or the like can be used. In particular, propylene carbonate, ethylene carbonate, 1,2-dimethoxyethane, dimethyl carbonate, diethyl carbonate, ethyl methyl carbonate, vinylene carbonate, and the like, and mixed solvents of these are suitably used. By particularly using one or more non-aqueous electrolytes selected from the group consisting of carbonates and ethers out of the above cited organic solvents, the solubility, dielectric constant, and viscosity of the supporting electrolyte are made excellent and the charge/discharge efficiency of the battery is made high, which is preferred.

In the lithium-ion secondary battery 1 of the present embodiment, the most preferable non-aqueous electrolyte 13 is obtained by dissolving the supporting electrolyte into the organic solvent.

(Negative Electrode)

As for the negative electrode 17, the negative electrode mixture layer 171 is formed by applying a negative electrode mixture, obtained by mixing a negative electrode active material and a binder, on the surface of the negative electrode current collector 170.

As the negative electrode active material, a conventional negative electrode active material can be used. A negative electrode active material containing at least one element of Sn, Si, Sb, Ge, and C can be cited. Out of these negative electrode active materials, C is preferably a carbon material capable of storing and desorbing electrolytic ions of the lithium-ion secondary battery 1 (a carbon material having a Li storage capacity), and C is more preferably amorphous-coated natural graphite.

Further, out of these negative electrode active materials, particularly, Sn, Sb, and Ge are alloy materials with great changes in volume. These negative electrode active materials may form alloys with other metals, such as Ti—Si, Ag—Sn, Sn—Sb, Ag—Ge, Cu—Sn, and Ni—Sn.

As the conductive material, a carbon material, a metal powder, a conductive polymer, or the like can be used. From the viewpoint of the conductivity and the stability, it is preferable to use a carbon material such as acetylene black, Ketjen black, or carbon black.

Examples of the binder may include polytetrafluoroethylene (PTFE), polyvinylidene fluoride (PVDF), a fluororesin copolymer (tetrafluoroethylene-hexafluoropropylene copolymer) SBR, acrylic rubber, fluoro-rubber, polyvinyl alcohol (PVA), styrene-maleic acid resin, sodium polyacrylate, and carboxylmethyl cellulose (CMC).

Examples of the solvent may include an organic solvent such as N-methyl-2-pyrrolidone (NMP), and water.

As the negative electrode current collector 170, it is possible to use a conventional current collector, and is possible to use a product obtained by processing a metal such as copper, stainless, titanium, and nickel, specifically foil processed into a sheet, a net, a punched metal or a formed metal, but these are not restrictive.

(Other Configurations)

The positive electrode case 11 and the negative electrode case 16 seal built-in contents by using the sealing member 12. The built-in contents include the non-aqueous electrolyte 13, the positive electrode 14, the separator 15, the negative electrode 17, the holding member 18, and the like.

The positive electrode mixture layer 141 comes into surface contact with the positive electrode case 11 via the positive electrode current collector 140, to make electrical conduction. The negative electrode mixture layer 171 comes into surface contact with the negative electrode case 16 via the negative electrode current collector 170.

The separator 15 interposed between the positive electrode mixture layer 141 and the negative electrode mixture layer 171 electrically insulates the positive electrode mixture layer 141 and the negative electrode mixture layer 171, and holds the non-aqueous electrolyte 13. As the separator 15, for example, a porous synthetic resin film, especially a porous film of a polyolefin polymer (polyethylene, polypropylene) is used. The separator 15 is molded into a larger size than sizes of the two mixture layers 141, 171 so as to ensure electrical insulation between the two mixture layers 141, 171.

The holding member 18 serves to hold the positive electrode current collector 140, the positive electrode mixture layer 141, the separator 15, the negative electrode mixture layer 171, and the negative electrode current collector 170 at regular positions. The use of an elastic member such as an elastic piece or a spring facilitates holding of those at the regular positions.

Other Embodiments

The lithium-ion secondary battery 1 of the present embodiment has the coin shape as described above, but the shape is not particularly limited. The lithium-ion secondary battery can be a battery in a variety of shapes such as a cylindrical shape and a prismatic shape, or an irregularly shaped battery sealed in a laminated exterior body.

(Manufacturing Method)

A manufacturing method for the positive electrode material of the present embodiment is not limited so long as the positive electrode material has the above configuration. Examples of the manufacturing method may include a solid-phase synthesis method, a co-precipitation synthesis method, a polymerized complex synthesis method, a method through ion exchange, a synthesis method by high temperature and high pressure treatment, a sol-gel method, a spray dry method, and a supercritical method. Also, the examples of the manufacturing method may include a method of using these methods singly or in combination.

EXAMPLES

Hereinafter, the present disclosure will be described with reference to examples.

As examples for specifically describing the present disclosure, a positive electrode material (positive electrode active material), and a positive electrode and a lithium-ion secondary battery using the positive electrode material were manufactured. In the examples, the lithium-ion secondary battery shown in FIG. 1 was manufactured.

Example 1

First, $Na_2NiSnO4$ as a starting material was manufactured. Specifically, a compound containing one or more elements of Na, Ni, and Sn was weighed and mixed such that these elements were at a predetermined atomic ratio. Then, the compound was sintered (in an atmosphere), to obtain a starting material having an almost single-phase crystal structure.

Subsequently, the obtained $Li_2NiSnO_4$ was heated in a molten salt composed of lithium nitrate and lithium chloride, to carry out ion-exchange treatment.

In the above manner, a positive electrode material ($Li_2NiSnO_4$ powder) of the present example was manufactured. When the manufactured $Li_2NiSnO_4$ powder was observed by powder XRD, it was confirmed that the powder was an almost single-phase compound.

Example 2

Aqueous solutions containing respective metal complexes of Li, Ni, Mn and Ge were prepared. The obtained complex solutions were mixed such that a composition ratio thereof was a composition ratio of a target positive electrode material, namely, an atomic ratio of Li:Ni:Mn:Ge was 2:1:0.67:0.33.

The obtained mixed solution was dried in a drying oven to remove an organic component by heating treatment, which was then calcined and sintered.

In the above manner, a positive electrode material ($Li_{2.1}NiMn_{0.67}Ge_{0.33}O_4$ powder) of the present example was manufactured. When the manufactured $Li_{2.1}NiMn_{0.67}Ge_{0.33}O_4$ powder was observed by powder XRD, it was confirmed that the powder was an almost single-phase compound.

Example 3

Similarly to the starting material of Example 1, an almost single phase $Na_2NiMn_{0.67}Ge_{0.33}O_4$ was manufactured.

Subsequently, the obtained $Na_2NiMn_{0.67}Ge_{0.33}O_4$ was subjected to the ion-exchange treatment in a similar manner to the case of Example 1.

In the above manner, a positive electrode material ($Li_2NiMn_{0.67}Ge_{0.33}O_4$ powder) of the present example was manufactured. When the manufactured positive electrode material was observed by powder XRD, it was confirmed that the powder was an almost single-phase compound.

Example 4

In a similar manner to the case of Example 2, a positive electrode material ($Li_{2.1}NiMn_{0.67}Sn_{0.33}O_4$ powder) of the present example was manufactured from an aqueous solution containing respective metal complexes. When the manufactured positive electrode material was observed by powder XRD, it was confirmed that the powder was an almost single-phase compound.

Example 5

Similarly to the starting material of Example 1, an almost single phase $Na_2NiMn_{0.67}Sn_{0.33}O_4$ was manufactured.

Subsequently, the obtained $Na_2NiMn_{0.67}Sn_{0.33}O_4$ was subjected to the ion-exchange treatment in a similar manner to the case of Example 1.

In the above manner, the positive electrode material ($Li_2NiMn_{0.67}Sn_{0.33}O_4$ powder) of the present example was manufactured. When the manufactured positive electrode material was observed by powder XRD, it was confirmed that the powder was an almost single-phase compound.

Example 6

In a similar manner to the case of Example 2, a positive electrode material ($L_{i2.1}Ni_{0.67}Co_{0.33}Mn_{0.33}Ge_{0.33}O_4$) of the present example was manufactured from an aqueous solution containing respective metal complexes.

When the manufactured positive electrode material was observed by powder XRD, it was confirmed that the powder was an almost single-phase compound.

Example 7

Similarly to the starting material of Example 1, an almost single phase $Na_2Ni_{0.67}Co_{0.33}Mn_{0.33}Ge_{0.33}O_4$ was manufactured.

Subsequently, the obtained $Na_2Ni_{0.67}Co_{0.33}Mn_{0.33}Ge_{0.33}O_4$ was subjected to the ion-exchange treatment in a similar manner to the case of Example 1.

In the above manner, a positive electrode material ($Li_2Ni_{0.67}Co_{0.33}Mn_{0.33}Ge_{0.33}O_4$ powder) of the present example was manufactured.

When the manufactured powder was observed by powder XRD, it was confirmed that the powder was an almost single-phase compound.

Example 8

In a similar manner to the case of Example 6, a positive electrode material ($Li_{2.1}Ni_{0.88}Co_{0.22}Mn_{0.44}Ge_{0.44}O_4$ powder) of the present example was manufactured from an aqueous solution containing respective metal complexes.

When the manufactured positive electrode material was observed by powder XRD, it was confirmed that the powder was an almost single-phase compound.

Example 9

In a similar manner to the case of Example 1, an almost single phase $Na_2Ni_{0.88}Co_{0.22}Mn_{0.44}Ge_{0.44}O_4$ was manufactured.

Subsequently, the obtained $Na_2Ni_{0.88}Co_{0.22}Mn_{0.44}Ge_{0.44}O_4$ was subjected to the ion-exchange treatment in a similar manner to the case of Example 1.

In the above manner, a positive electrode material ($Li_2Ni_{0.88}Co_{0.22}Mn_{0.44}Ge_{0.44}O_4$ powder) of the present example was manufactured.

When the manufactured positive electrode material was observed by powder XRD, it was confirmed that the powder was an almost single-phase compound.

Example 10

As the positive electrode material of the present example, a positive electrode material showing the following analysis results was prepared.

ICP-OES and power XRD analysis were performed on the positive electrode material. As a result, it was confirmed that the positive electrode material of the present example was a compound having a composition $Li_2NiGeO_4$ and a layered rock-salt crystal structure, and indexible in a space group R3m (or C2/m). Further, it was also confirmed by power XRD that the positive electrode material of the present example was an almost single-phase material.

Comparative Example 1

In a similar manner to the case of Example 2, a positive electrode material ($Li_{1.05}NiO_2$ powder) of the present example was manufactured from an aqueous solution containing respective metal complexes. When the manufactured $Li_{1.05}NiO_2$ powder was observed by powder XRD, it was confirmed that the powder was an almost single-phase compound.

<XAFS>

An X-ray absorption spectrum at an oxygen K absorption edge for the positive electrode material of each of the examples described above was measured by the X-ray absorption fine structure (XAFS) analytical method.

In any of the examples, it was confirmed that an absorption edge peak was in the range of 532 eV to 535 eV.

As typified examples, measurement results of the X-ray absorption spectrums of Examples 1, 2, 4 and 10 were shown in FIGS. 2 to 5. In addition, the X-ray absorption spectrum of Comparative Example 1 was also shown in each of the drawings.

Example 1

Figure 2:
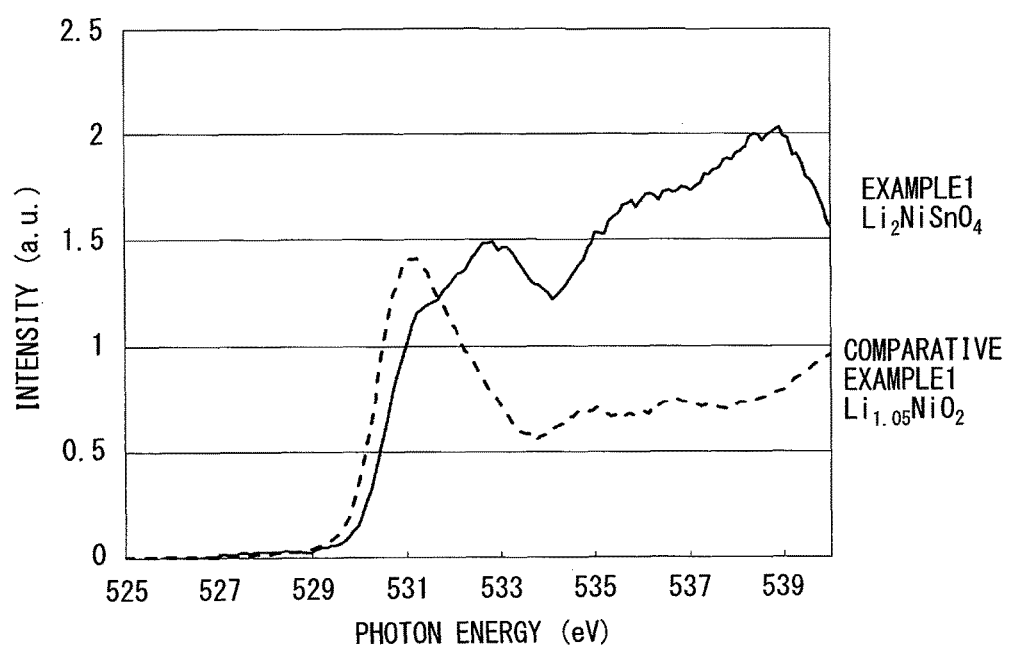
FIG. 2 is a graph showing a measurement result of an X-ray absorption fine structure (XAFS) analytical method on a positive electrode material of Example 1.

As shown in FIG. 2, in the positive electrode material of Example 1, a peak can be confirmed in the range of 532 eV to 533 eV. This peak is caused by a Sn—O bond. That is, the positive electrode material of Example 1 has the Sn—O bond.

Further, in the positive electrode material of Comparative Example 1 indicated by a broken line in FIG. 2, a peak can be confirmed in the vicinity of 530 eV. That is, the material does not have a peak in the range of 532 eV to 535 eV. This peak is caused by a Ni—O bond.

Example 2

Figure 3:
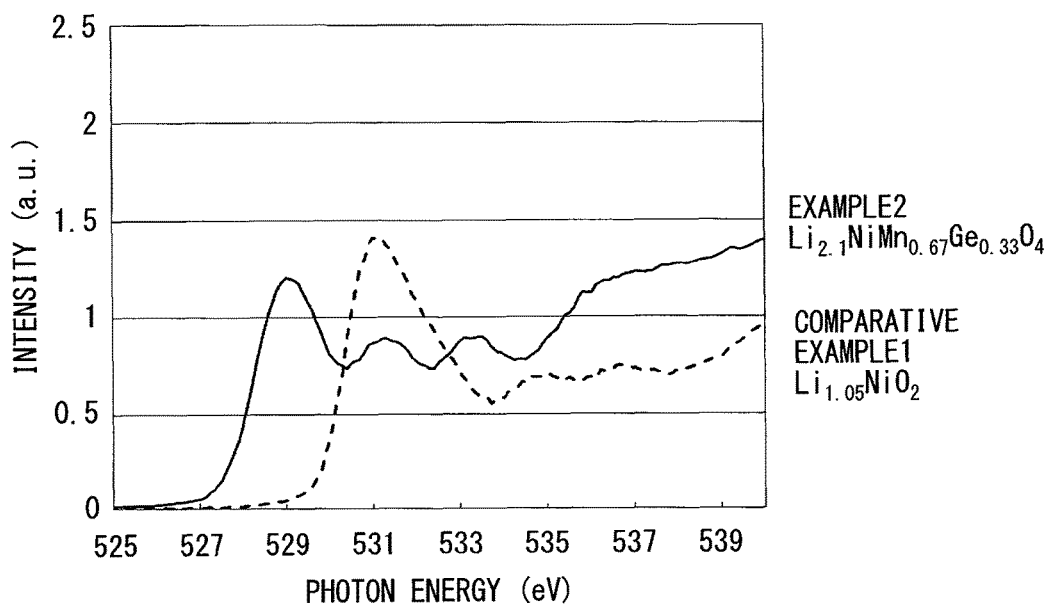
FIG. 3 is a graph showing a measurement result of the X-ray absorption fine structure (XAFS) analytical method on a positive electrode material of Example 2.

As shown in FIG. 3, in the positive electrode material of Example 2, three peaks can be confirmed in the range of 528 eV to 529 eV, in the vicinity of 531 eV, and in the range of 533 eV to 534 eV. These peaks are caused by a Mn—O bond, the Ni—O bond, and a Ge—O bond in ascending order from the lowest-eV peak. That is, the positive electrode material of Example 2 has the Ge—O bond.

Example 4

Figure 4:
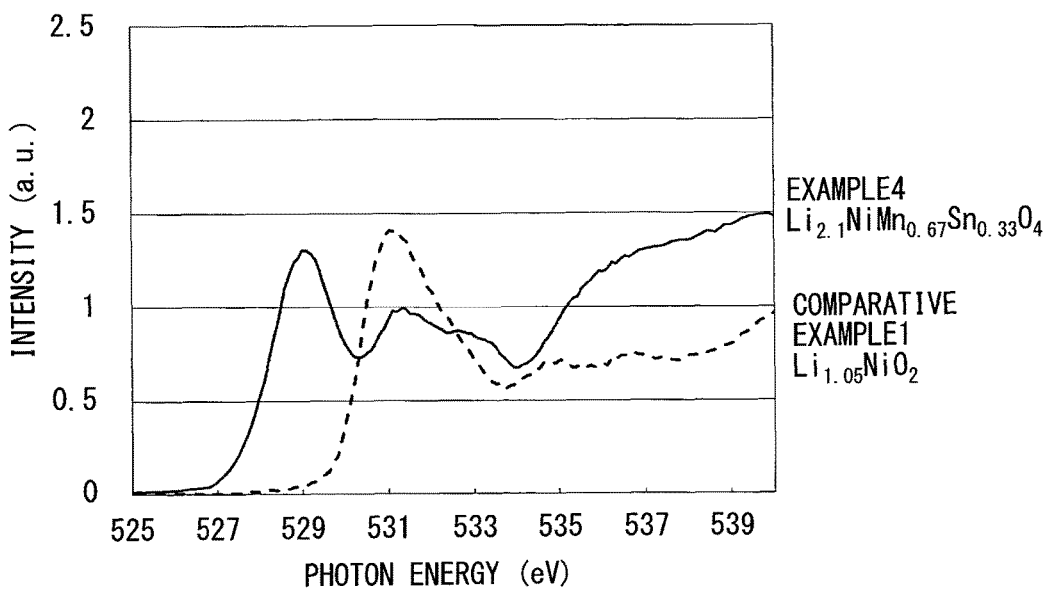
FIG. 4 is a graph showing a measurement result of the X-ray absorption fine structure (XAFS) analytical method on a positive electrode material of Example 4.

As shown in FIG. 4, in the positive electrode material of Example 2, three peaks can be confirmed in the range of 528 eV to 529 eV, in the vicinity of 531 eV, and in the vicinity of 533 eV. These peaks are caused by the Mn—O bond, the Ni—O bond, and the Sn—O bond in ascending order from the lowest-eV peak. That is, the positive electrode material of Example 4 has the Sn—O bond.

Example 10

Figure 5:
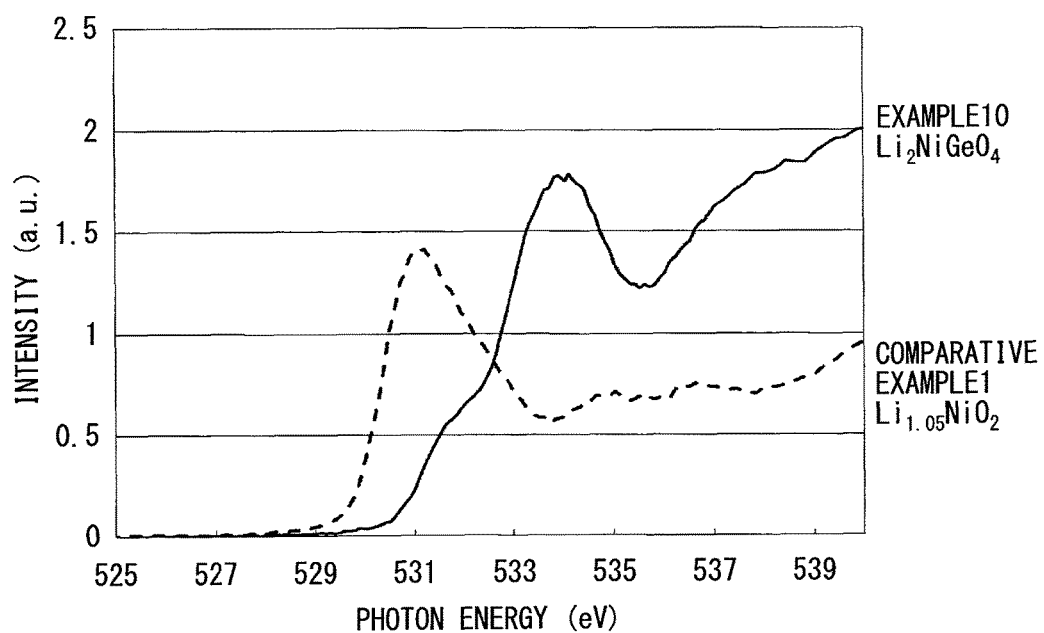
FIG. 5 is a graph showing a measurement result of the X-ray absorption fine structure (XAFS) analytical method on a positive electrode material of Example 10.

As shown in FIG. 5, in the positive electrode material of Example 10, two peaks can be confirmed in the vicinity of 531 eV and in the range of 533 eV to 534 eV. These peaks are caused by the Ni—O bond and the Ge—O bond in ascending order from the lowest-eV peak. That is, the positive electrode material of Example 10 has the Ge—O bond.

<Evaluation>

As evaluation of the positive electrode material of each example above, a lithium-ion secondary battery was assembled, to evaluate charge/discharge characteristics. Further, after measurement of the charge/discharge characteristics, the coin type battery was disassembled and the positive electrode was taken out, to evaluate the safety.

(Lithium-Ion Secondary Battery)

Using the positive electrode active material of each example above, a test cell (2032 coin type half cell) made of the lithium-ion secondary battery was assembled, to perform evaluation.

(Coin Type Half Cell)

A test cell (coin type half cell) has a similar configuration to that of the coin type lithium-ion secondary battery 1, the configuration of which was shown in FIG. 1.

As the positive electrode, there was used a positive electrode with the positive electrode mixture layer 141 formed by applying a positive electrode mixture, obtained by mixing 91 parts by mass of the positive electrode active material (positive electrode active material of each example), 2 parts by mass of acetylene black, and 7 parts by mass of PVDF, to the positive electrode current collector 140 made of aluminum foil.

As the negative electrode (counter electrode), metallic lithium was used. This corresponds to the negative electrode mixture layer 171 in FIG. 1.

The non-aqueous electrolyte 13 was prepared by dissolving $LiPF_6$ into a mixed solvent of 30 vol % of ethylene carbonate (EC) and 70 vol % of diethyl carbonate (DEC) such that 1 mol/l of $LiPF_6$ was contained.

After being assembled, the test cell was subjected to activation treatment by ⅓ C×2 cycles of charge/discharge.

In the above manner, the test cell (half cell) of each example was manufactured.

<Charge/Discharge Characteristics>

The lithium-ion secondary battery was charged and discharged at the rate of 1/50 C. The charge was performed by CC charge with 4.5-V cut off, and the discharge was performed by CC discharge with 2.6-V cut off.

Table 1 shows measurement results of a charging capacity and a discharging capacity of the lithium-ion secondary batteries of example (Examples 1 to 10, Comparative Example 1).

TABLE 1

| | Positive electrode | | Battery evaluation | | |
|---|---|---|---|---|---|
| | Chemical formula | Presence of XAFS peak in 532 eV-535 eV Yes/No | Charging capacity (mAh/g) | Discharging capacity (mAh/g) | Amount of oxygen generated in safety test (%) |
| Example 1 | $Li_2NiSnO_4$ | Yes | 140 | 120 | 0.47 |
| Example 2 | $Li_{2.1}NiMn_{0.67}Ge_{0.33}O_4$ | Yes | 170 | 155 | 0.49 |
| Example 3 | $Li_2NiMn_{0.67}Ge_{0.33}O_4$ | Yes | 188 | 172 | 0.48 |
| Example 4 | $Li_{2.1}NiMn_{0.67}Sn_{0.33}O_4$ | Yes | 152 | 140 | 0.62 |
| Example 5 | $Li_2NiMn_{0.67}Sn_{0.33}O_4$ | Yes | 157 | 146 | 0.59 |
| Example 6 | $Li_{2.1}Ni_{0.67}Co_{0.33}Mn_{0.33}Ge_{0.33}O_4$ | Yes | 180 | 161 | 0.71 |
| Example 7 | $Li_2Ni_{0.67}Co_{0.33}Mn_{0.33}Ge_{0.33}O_4$ | Yes | 178 | 166 | 0.77 |
| Example 8 | $Li_{2.1}Ni_{0.88}Co_{0.22}Mn_{0.44}Ge_{0.44}O_4$ | Yes | 164 | 147 | 0.65 |
| Example 9 | $Li_2Ni_{0.88}Co_{0.22}Mn_{0.44}Ge_{0.44}O_4$ | Yes | 164 | 150 | 0.64 |
| Example 10 | $Li_2NiGeO_4$ | Yes | 152 | 141 | 0.58 |
| Comparative Example 1 | $Li_{1.05}NiO_2$ | No | 172 | 155 | 6.99 |

As shown in Table 1, the secondary batteries of the examples have the excellent charging capacity and the discharging capacity compared to that of Comparative Example 1.

That is, it was confirmed that favorable charge/discharge characteristics can be obtained in the secondary battery of each example.

<Safety Test>

The lithium-ion secondary battery was charged by CC charge at the rate of 1/50 C up to 4.8 V.

After the charge, the battery was disassembled and the positive electrode was taken out.

The taken-out positive electrode was washed by DMC, and then heated in a helium atmosphere from a room temperature to 1000° C. with a programming rate of 20° C./min. An amount of oxygen generated from the positive electrode at that time was measured by TPD-MS measurement.

Table 1 also shows measurement results.

As shown in Table 1, it is found that the amount of oxygen generated in Comparative Example 1 is as large as 6.99%. It is then found that the amount of oxygen generated in each example is as low as 1% or lower (0.77% at the maximum).

That is, it is found that the use of the positive electrode material (positive electrode) of each example makes the secondary battery generate a small amount of oxygen and have excellent safety.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A positive electrode material comprising:

$$Li_2Ni_\alpha M^1_\beta M^2_\gamma Mn_\eta O_{4-\epsilon};$$

a layered structure including a Li layer and a Ni layer separate from the Li layer; and
a chemical bond of $M^2$-O, wherein:
$\alpha$ satisfies an equation of $0.50<\alpha\leq1.33$;
$\beta$ satisfies an equation of $0\leq\beta<0.67$;
$\gamma$ satisfies an equation of $0.33\leq\gamma\leq1.1$;
$\eta$ satisfies an equation of $0\leq\eta\leq1.00$;
$\epsilon$ satisfies an equation of $0\leq\epsilon\leq1.00$;
$M^1$ represents at least one selected from Co and Ga; and
$M^2$ represents Ge.

2. The positive electrode material according to claim 1, wherein:
the positive electrode material provides an absorption edge peak in a range between 532 eV and 535 eV in a X-ray absorption spectrum at an oxygen K absorption edge, which is measured by an X-ray absorption fine structure analytical method.

3. The positive electrode material according to claim 1, wherein:
the Li layer is made of Li as a main component;
the Ni layer is made of Ni, $M^1$ and $M^2$ as main components; and
$\beta$ satisfies an equation of $0<\beta<0.67$.

4. The positive electrode material according to claim 1, further comprising:
a local structure with 6-coordinated Ni, $M^1$ and $M^2$; and
$\beta$ satisfies an equation of $0<\beta<0.67$.

5. The positive electrode material according to claim 1, wherein:
$\beta$ satisfies an equation of $0<\beta<0.67$.

6. A positive electrode material comprising:

$$Li_2Ni_\alpha M^1_\beta M^2_\gamma Mn_\eta O_{4-\epsilon};$$

a layered structure including a Li layer and a Ni layer separate from the Li Layer; and
a chemical bond of $M^2$-O, wherein:
$\alpha$ satisfies an equation of $0.50<\alpha\leq1.33$;
$\beta$ satisfies an equation of $0\leq\beta<0.67$;
$\gamma$ satisfies an equation of $0.33\leq\gamma\leq1.1$;
$\eta$ satisfies an equation of $0<\eta\leq1.00$;
$\epsilon$ satisfies an equation of $0\leq\epsilon\leq1.00$;
$M^1$ represents at least one selected from Co and Ga; and
$M^2$ represents Sb.

7. The positive electrode material according to claim 6, wherein:
$\beta$ satisfies an equation of $0<\beta<0.67$.

8. A positive electrode material comprising:

$$Li_2Ni_\alpha M^1_\beta M^2_\gamma Mn_\eta O_{4-\epsilon};$$

a layered structure including a Li layer and a Ni layer separate from the Li layer; and
a chemical bond of $M^2$-O, wherein:
$\alpha$ satisfies an equation of $0.50<\alpha\leq1.33$;
$\beta$ satisfies an equation of $0\leq\beta<0.67$;
$\gamma$ satisfies an equation of $0.33\leq\gamma\leq1.1$;
$\eta$ satisfies an equation of $0\leq\eta\leq1.00$;
$\epsilon$ satisfies an equation of $0\leq\epsilon\leq1.00$;
$M^1$ represents at least one selected from Co and Ga; and
$M^2$ represents Sn.

9. The positive electrode material according to claim 8, wherein:
$\beta$ satisfies an equation of $0<\beta<0.67$.

10. A positive electrode for a non-aqueous electrolyte secondary battery, the positive electrode comprising:
the positive electrode material according to claim 1.

11. A non-aqueous electrolyte secondary battery comprising:
a positive electrode for a non-aqueous electrolyte secondary battery including the positive electrode material according to claim 1.

* * * * *